US012230294B2

(12) United States Patent
Guggenberger et al.

(10) Patent No.: US 12,230,294 B2
(45) Date of Patent: Feb. 18, 2025

(54) DYNAMICALLY GENERATED CONTENT STICKERS FOR USE IN VIDEO CREATION

(71) Applicant: Microsoft Technology Licensing, LLC, Redmond, WA (US)

(72) Inventors: Nathan Leigh Guggenberger, Maple Grove, MN (US); Justin James Chando, Bellevue, WA (US); Jamie Yuok Lee, Kathleen, GA (US); Brooke Ann Hollabaugh, Los Angeles, CA (US); Daniela Cardona Jimenez, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/697,686

(22) Filed: Mar. 17, 2022

(65) Prior Publication Data

US 2023/0298629 A1   Sep. 21, 2023

(51) Int. Cl.
*G11B 27/036*  (2006.01)
*G06F 3/0482*  (2013.01)
*G06F 16/78*   (2019.01)
*G06T 11/00*   (2006.01)

(52) U.S. Cl.
CPC .......... *G11B 27/036* (2013.01); *G06F 3/0482* (2013.01); *G06F 16/7867* (2019.01); *G06T 11/00* (2013.01)

(58) Field of Classification Search
CPC . G11B 27/036; G06F 3/0482; G06F 16/7867; G06T 11/00
USPC .......................................... 386/282
See application file for complete search history.

(56) References Cited

U.S. PATENT DOCUMENTS

| | | | |
|---|---|---|---|
| 10,446,189 B2* | 10/2019 | Zukerman | H04N 21/8146 |
| 10,681,310 B2* | 6/2020 | Garrido | H04N 7/147 |
| 10,788,971 B2* | 9/2020 | Quintero | G06Q 10/10 |
| 11,237,717 B2* | 2/2022 | Takeda | G06F 3/0488 |
| 11,889,132 B2* | 1/2024 | Tang | H04N 21/234 |
| 11,889,229 B2* | 1/2024 | Garrido | H04L 51/10 |
| 2022/0093132 A1* | 3/2022 | Ge | G11B 27/031 |
| 2024/0104808 A1* | 3/2024 | Oefverstroem | H04L 51/10 |

\* cited by examiner

*Primary Examiner* — Helen Shibru
(74) *Attorney, Agent, or Firm* — RAY QUINNEY & NEBEKER; Tiffany Healy (57) ABSTRACT

The present disclosure relates to methods and devices for dynamically generating stickers for use with a video. The methods and devices may dynamically generate a plurality of stickers in response to receiving a query with search terms for a sticker to add to a video being created. The plurality of stickers may include interactive content related to the search terms. The methods and devices may receive a selection of one or more of the stickers to include in the video. Upon an indication that a video is to be played, the methods and device may regenerate the selected stickers for the video with the content and provide video output with the video and one or more overlays with the selected stickers for presentation on a display.

19 Claims, 8 Drawing Sheets

DYNAMICALLY GENERATED CONTENT STICKERS FOR USE IN VIDEO CREATION

BACKGROUND

Video creation platforms allow users to create videos and add emojis or other icons to the videos being created by users. Typically, once a video is recorded users can watch and consume the content recorded in the video. Current solutions provide some dynamically generated content to the videos, but the content is contained to the current user and information already included in the video creation platform.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a query with a search term for a sticker to add to a video being created. The method includes obtaining content related to the search term from a datastore. The method includes dynamically generating a plurality of stickers with the content based on the query. The method includes receiving a selection of at least one sticker of the plurality of stickers for the video. The method includes receiving a placement of the at least one sticker in the video. The method includes storing metadata associated with the video, wherein the metadata includes sticker information with the content and the placement of the at least one sticker.

Some implementations relate to a device. The device includes one or more processors; memory in electronic communication with the one or more processors; and instructions stored in the memory, the instructions being executable by the one or more processors to: receive a query with a search term for a sticker to add to a video being created; obtain content related to the search term from a datastore; dynamically generate a plurality of stickers with the content based on the query; receive a selection of at least one sticker of the plurality of stickers for the video; receive a placement of the at least one sticker in the video; and store metadata associated with the video, wherein the metadata includes sticker information with the content and the placement of the at least one sticker.

Some implementations relate to a method. The method includes receiving a selection of a video to play. The method includes obtaining the video and metadata associated with the video, wherein the metadata includes sticker information for at least one sticker with content and a placement of the at least one sticker in the video. The method includes dynamically regenerating the at least one sticker with the content based on the sticker information. The method includes placing the at least one sticker in an overlay over the video based on the sticker information. The method includes providing video output with the video and the overlay with the at least one sticker for presentation on a display.

Some implementations relate to a device. The device includes one or more processors; memory in electronic communication with the one or more processors; and instructions stored in the memory, the instructions being executable by the one or more processors to: receive a selection of a video to play; obtain the video and metadata associated with the video, wherein the metadata includes sticker information for at least one sticker with content and a placement of the at least one sticker in the video; dynamically regenerate the at least one sticker with the content based on the sticker information; place the at least one sticker in an overlay over the video based on the sticker information; and provide video output with the video and the overlay with the at least one sticker for presentation on a display.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to generating stickers for use in video creation. Video creation platforms allow users to create videos and add emojis or other icons to the videos being created by users. Typically, once a video is recorded users can watch and consume the content recorded in the video. Current solutions provide some dynamically generated content to the videos, but the content is contained to the current user and information already included in the video creation platform. The content provided by current solutions to the videos does not provide live content or content obtained from third party datastores.

The present disclosure provides methods and devices that leverage a datastore of content to create dynamically generated, content driven stickers to embed into video recordings. Stickers include static and/or dynamic content placed on the video. Examples of stickers include emojis, pictures, drawings, and/or text. The stickers provide additional content outside of the video to users consuming the video (e.g., watching videos or playing videos). For example, searching the stickers page of the video platform for "Bill Nye" may provide multiple different layouts of stickers featuring Bill Nye, information about Bill Nye, Bill Nye's career path, age, interests, etc.

The methods and devices may dynamically generate a plurality of stickers in response to receiving a query with search terms for a sticker to include in a video when a user is creating a video. The plurality of stickers may include interactive content related to the search terms. In an implementation, the content is obtained from a third party datastore.

The methods and devices may run the user's search query through an API associated with a datastore to determine whether any of the search terms from the query match any rich content resources in the datastore. If a match occurs between the search terms and the rich content resources, the results may be used to dynamically generate assets that the end user can customize and include in stickers to use in the video being creating. In addition to the dynamic layout, the user may also choose which information to show alongside the sticker The layout of the automatically created stickers is driven by the content the user searched for in the query. In addition, the content of the stickers may be interactive when the user clicks on the sticker. The dynamic nature of the content allows the methods and devices to provide the user with multiple different formats of a sticker to use, instead of statically-generated content. This provides contextually, temporally aware content that cannot be captured or that needs to be manually updated when leveraging a pool of static content.

The user may select one or more of the stickers to include in the video. The selected stickers are placed in overlays on the video. As such, the selected stickers are not part of the video. Sticker information (e.g., the content of the sticker, the placement of the sticker, etc.) is stored in metadata associated with the video and the sticker information is used to regenerate the stickers upon video consumption (e.g., playing or watching the video). Upon an indication that a video is to be played, a sticker regeneration component obtains the content of the selected stickers for the video and regenerates the selected stickers. Video output is created with the video and one or more overlays placed on top of the video with the selected stickers. The video output is provided for presentation on a display. As such, as the video plays, the selected stickers are presented over the video using the overlays. The viewer of the video may interact with the selected stickers while the video is playing to obtain additional information and/or details related to the video. Interacting with the selected stickers may include expanding the content, tapping the content, swiping the content, sliding the content, and/or holding a stick.

One example use case includes a student using the video platform to create a video for a school project on the state Arizona. The student may select the sticker icon and perform and search with the search term "Arizona." The sticker generating component may obtain content related to Arizona from a datastore and automatically generate a plurality of stickers with content related to Arizona. For example, one sticker includes the state capitol of Arizona. Another sticker includes facts about Arizona. Another sticker includes an image of the state flower of Arizona. Another sticker includes a picture of the Grand Canyon. Another sticker includes a picture of the Painted Desert. Another sticker includes the current weather of Arizona. The student may select one or more of the stickers with the content related to Arizona to include in the video about Arizona. Upon the teacher, or other students, viewing the video on Arizona, the sticker regenerating component obtains the content for the selected stickers from the datastore and regenerates the selected stickers to place in overlays as the video plays. If any of the content changed between the creation of the video and the playing of the video, the content is updated with the newest content stored in the datastore. For a example, if the student selected the sticker with the weather of Arizona, the sticker may display the current weather for Arizona when the video is being played. As such, the student may use the video creation platform to create videos with dynamically driven content for stickers to embed in the video recordings.

One technical advantage of the methods and devices is an improvement in the video creation platforms and/or video creation software by returning stickers to the user that are time-sensitive and update when someone changes job, switches teams, the time/weather changes, etc. In an implementation, the stickers are a live sticker that change when consuming the video depending on when another user is watching the video.

Another technical advantage of the methods and devices of the present disclosure is allowing the users to seamlessly discover and/or engage with additional content related to the video while remaining in-context of the video platform. By having the selected stickers display in an overlay of the video, the user is able to view and/or interact with the additional content while remaining within the interface of the video platform. Another technical advantage of the methods and devices of the present disclosure is storing the data efficiently. By storing the metadata for the selected stickers with the video, the video platform may easily extrapolate the information stored in the metadata and dynamically regenerate the selected stickers.

As such, the methods and devices of the present disclosure provide an interactive and engaging video platform that allows users to consume and/or interact with additional content related to the video regardless of the video platform being used to consume the videos. The methods and devices of the present disclosure provide video engagement to promote social learning by providing engaging and expressive storytelling. The methods and devices provide engaging, customized content to users to use in video creation and storytelling. Thus, the methods and devices provide an interactive video experience that brings the viewer of the video into and apart of the story that the video creator is trying to tell.

Figure 1:
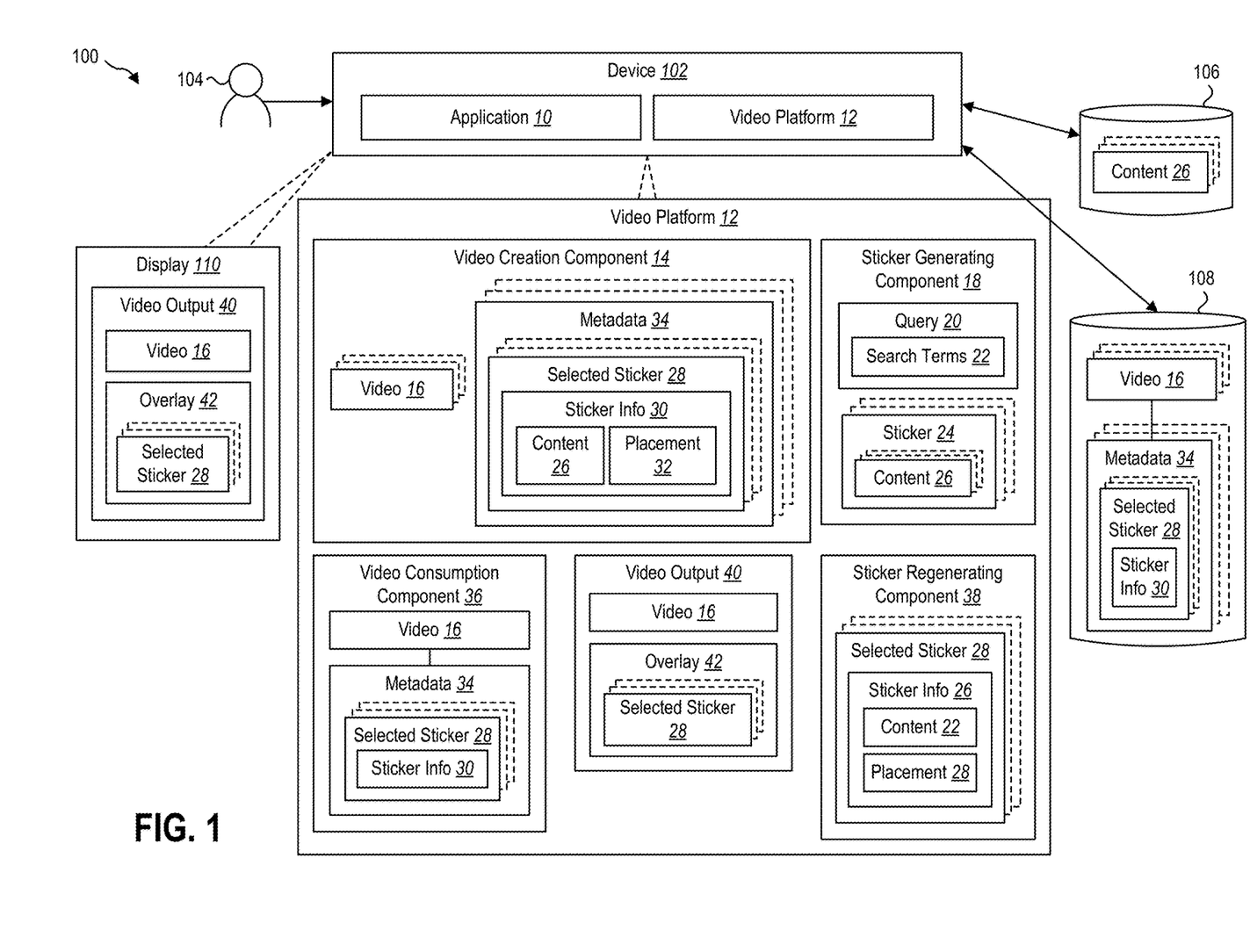
FIG. 1 illustrates an example environment for generating stickers for videos in accordance with implementations of the present disclosure.

Referring now to FIG. 1, illustrated is an example environment 100 for generating stickers 24 for videos 14. The environment 100 may include one or more users 104 interacting with one or more devices 102. The devices 102 may include a video platform 12 that allows the users 104 to create videos 14 and/or to consume (e.g., viewing or playing) videos previously created and/or published to the video platform 12. The users 104 may use one or more applications 10 on the device 102 to access the video platform 12.

In an implementation, the users 104 may use the device 102 to access the video platform 12 on a remote device or server using, via a network. The network may include one or multiple networks and may use one or more communication platforms or technologies suitable for transmitting data. The network may refer to any data link that enables transport of electronic data between devices and/or components of the environment 100. The network may refer to a hardwired network, a wireless network, or a combination of a hardwired and a wireless network. In one or more implementations, the network includes the Internet.

The video platform 12 may include a video creation component 14 that allows the user 104 to create one or more videos 16. The users 104 may provide input to the video creation component 14 to add one or more stickers 24 to the video 16. For example, the user selects an icon to add stickers 24 to the video 16. The stickers 24 allow the users 104 to add additional details and/or information outside of what is said or shown in the video 16. The stickers 24 include static and/or dynamic content 26 placed on the video 16. Examples of the stickers 24 include emojis, graphics interchange format (GIF)s, drawings, videos, audio, music, photographs, text, and/or other additional information.

A sticker generating component 18 may allow the user 104 to enter one or more queries 20 with search terms 22 for additional information to include in the stickers 24. For example, the user 104 may input the queries 20 in a text box. Another example includes using audio input for a spoken query 20 provided by the user 104. The search terms 22 may include, for example, a name, object, landmark, place, location, or subject included in the video 16. The sticker generating component 18 obtains content 26 related to or associated with the search terms 22 and automatically generates one or more stickers with the obtained content 26. The content 26 may be static content or dynamic content.

The content 26 is obtained by the sticker generating component 18 from one or more datastores 106. For example, the sticker generating component 18 may use one or more application programming interfaces (APIs) to access the content 26 from the datastores 106. The sticker generating component 18 may access the datastores 106 via the network. The datastores 106 provide an external knowledge source of the content 26 to the video platform 12. In an implementation, the datastore 106 provides content 26 from a third party. The datastore 106 may be updated as new content 26 is obtained by the datastores 106 and/or provided to the datastores 106.

The sticker generating component 18 may generate different stickers 24 (e.g., live stickers or static stickers) with the content 26. Live stickers may dynamically update as the content 26 changes. Live stickers may have different content 26 as the video 16 plays (e.g., a countdown changes as the video 16 plays). In addition, live stickers may have different content 26 when the video 16 is viewed as compared to when the video 16 is created. For example, if the video 16 is created at a start of a sports game or before a sports game, a score of the game is updated in the live sticker as the video 16 plays and/or the score changes as the game is played. Static stickers may not change over time. For example, a box-score of a game is frozen at the time of recording the video 16 and the score does not update in the video 16 as the game is played and/or the score changes.

The sticker generating component 18 automatically creates pre-populated stickers 24 based on the search terms 22 of the queries 20 provided by the users 104. The sticker generating component 18 may obtain related content 26 from the datastores 106 by matching the words or phrases in the content 26 to the search terms 22 and use the content 26 in automatically creating the stickers 24. In some implementations, the datastores 106 determines whether the content 26 is related to search terms 22 by comparing the search terms 22 to the content 26. If a match occurs, the datastores 106 determine that the content 26 is related to the search terms 22. If a match does not occur, the datastores 106 determines that the content 26 is unrelated to the search terms 22. In some implementations, the sticker generating component 18 determines whether the content 26 is related to the search terms 22 by comparing the search terms 22 to the content 26.

The sticker generating component 18 may also obtain content 26 that is temporally related to the search terms 22. Temporally related content 26 to the search terms 22 may include any data or content 26 that may be different from when the video 16 is created and when the video 16 is viewed later. Examples of temporally related content 26 include a score of a game (the score may be different content when the video is viewed versus when the video was created as the game plays), the net worth of an individual, and/or a countdown timer to an event.

The sticker generating component 18 may also obtain content 26 that is contextually related to the search terms 22. Contextually related content 26 may not be the exact search terms 22 included in the query 20 but may be related to the search terms 22. For example, if the user 104 searches for "Bill Gates" as the search terms 22, Steve Balmer or Satya Nadella may be contextually related content 26 that is provided in response to the query 20 since the individuals have been and/or are Chief Executive Officers (CEOs) of MICROSOFT.

As such, the sticker generating component 18 dynamically generates one or more stickers 24 with content 26 related to the search terms 22 obtained from the datastores 106 based on the searching performed by the user 104.

One example use case includes the user 104 providing a query 20 with search terms 22 for a famous individual. The datastore 106 may include content 26 with additional information for the famous individual, such as, an image of the individual, the individuals' name, physical attributes of the individual (height, hair color, eye color, etc.), and/or background information of the individual (schools attended, where the individual lives, where the individual works, hobbies, etc.). The sticker generating component 18 generates a plurality of stickers 24 for the famous individual with the content 26 obtained from the datastore 106. For example, one sticker 24 includes the individual's name. Another sticker 24 includes the height of the individual. Another sticker 24 includes the name of the schools attended by the individual. Another sticker 24 includes hobbies of the individual.

Another example use case includes the user 104 providing a query 20 with search terms 22 for a sports team. The datastore 106 may include content 26 with past scores of the sports team. In addition, the datastore 106 may include content 26 that is updated with new scores and/or the scores of games as they are played. The sticker generating component 18 generates a plurality of stickers 24 for the sports team. For example, one sticker may include the team logo. Another sticker may include scores from a championship game previously played by the sports team. Another sticker may include information from a game that the sports team is scheduled to play.

The user 104 may select one or more of the stickers 24 generated for the video 16. In an implementation, the selected stickers 28 for the video 16 are a subset of the plurality of stickers 24 automatically generated by the sticker generating component 18. In another implementation, the selected stickers 28 for the video 16 include all of the stickers 24 automatically generated by the sticker generating component 18.

The user 104 may select a placement 32 for the selected stickers 28. The placement 32 may be a time frame in the video 16 and/or a selected scene in the video 16 where the selected sticker 28 appears. For example, the user 104 places a selected sticker 28 at a first time (e.g., 3 minutes) in the video 16 and places a different selected sticker 28 at a second time (e.g., 4 minutes) in the video 16. Another example includes the user 104 places three different selected stickers 28 (e.g., a sticker of the name of a sports team, a sticker with the logo of the sports team, and a sticker with the score of a game that the sports team played) at the same time in the video 16. As such, the user 104 may add multiple stickers 24 to the video 16.

In addition, the placement 32 may indicate a position for the selected sticker 28 on a screen of the display 110 (e.g., a top portion of the screen, a lower portion of the screen, in a corner of the screen, on a side of the screen, and/or diagonally across the screen). The placement 32 may also indicate a size of the selected sticker 28. As such, the placement 32 may also indicate a rotation of the selected sticker 28 and a scale of the selected sticker 28.

The user 104 may also customize the selected stickers 28. For example, the user 104 may make the selected sticker 28 a static sticker or a live sticker. Another example of customizing the selected stickers 28 includes the user 104 resizing the selected stickers 28. Another example of customizing the selected stickers 28 includes changing a size of the text or images included in the content 26. Another example of customizing the selected stickers 28 includes changing a theme or background of the selected stickers 28. Another example of customizing the selected stickers 28 includes flipping an orientation of the selected stickers 28.

The selected stickers 28 are placed in an overlay or pop up window over the video 16 using the placement 32 information provided by the user 104. As such, the selected stickers 28 are not part of the video 16 itself, but instead, are identified with metadata 34 associated with the video 16. For each of the selected stickers 28, the metadata 34 includes sticker information 30. The sticker information 30 includes the content 26 provided with the selected sticker 28. In addition, the sticker information 30 includes the placement 32 for the selected sticker 28. The sticker information 30 may also include details regarding any customization (e.g., live sticker, static sticker, styling of the sticker, or changes to themes of the sticker) provided by the user 104. As such, the sticker information 30 may include any additional details regarding the selected sticker 28.

Upon completing the video 16 creation process, the video platform 12 may store the video 16 and the associated metadata 34 in one or more datastores 108. The video platform 12 may access the datastores 108 via the network. The videos 16 may be accessed or obtained from the datastores 108 when the user 104 or other viewers want to play the videos 16.

The video platform 12 may also include a video consumption component 36 that allows the user 104 or other viewers to consume the videos 16 (e.g., play the videos 16 or watch the videos 16). The video consumption component 36 may receive a selected video 16 from the user 104 to play. For example, the user 104 searches for a video 16, provides a title of a video 16, and/or selects an icon for the video 16. The video consumption component 36 obtains the video 16 selected by the user 104 and the associated metadata 34 from the datastore 108.

A sticker regenerating component 38 may dynamically regenerate the selected stickers 28 based on the sticker information 30. The sticker regenerating component 38 uses the sticker information 30 to identify which content 26 to obtain from the datastores 106 for the selected stickers 28. As such, in response to the user 104 providing an indication to view the selected video 16, the sticker regenerating component 38 obtains the content 26 for the selected stickers 28 associated with the video 16. If the content 26 changes and/or is updated in the datastore 106 between the creation of the video 16 and the consumption of the video 16, the content 26 obtained by the sticker regenerating component 38 may be the most up to date content 26 available in the datastores 106. Thus, upon consumption of the video 16, the content 26 included in the selected stickers 28 includes the latest information or details regarding the topic from the datastore 106.

In addition, the sticker regenerating component 38 uses the sticker information 30 to identify any details regarding the selected stickers 28 (e.g., a theme of the selected stickers, whether the selected stickers 28 are live stickers or static stickers, and/or a size of the text or images of the content 26). The sticker regenerating component 38 may also use the sticker information 30 to identify a placement 32 of the selected stickers 28. The sticker regenerating component uses the sticker information 30 to regenerate the selected stickers 28 based on any customization provided by the user 104.

The video consumption component 36 may generate video output 40 with the video 16 and one or more overlays 42 to display the selected stickers 28 over the video 16 as the video 16 is playing. The overlays 42 are visually distinct from the video 16 (e.g., have a border or otherwise offset the selected stickers 28 from the video 16).

The video consumption component 36 uses the sticker information 30 to identify a placement 32 of the selected stickers 28 in the video 16. The video consumption component 36 uses the placement 32 to determine a time in the video 14 to place the selected stickers 28. In addition, the video consumption component 36 uses the placement 32 to determine a scale and/or a rotation of the selected stickers 28. The video consumption component 36 also uses the placement 32 to determine a position on the screen to display the selected stickers 28 (e.g., coordinates of the display 110 where the selected sticker 28 is positioned).

The video output 40 is presented on a display 110 of the device 102. The user 104 may view the video 16 and the selected stickers 28. By having the selected stickers 28 displayed in overlays 42 of the video 16, the user 104 may interact with the selected stickers 28. For example, the user 104 expands the content 26 presented in the selected stickers 28. Another example of interacting with the selected stickers 28 includes purchasing a product included in the content 26 by selecting the product in the content 26. Another example of interacting with the selected stickers 28 includes loading a webpage identified in the content 26 within the overlay 42. Another example of interacting with the selected stickers 28 includes answer questions provided in the content 26 within the overlay 42. Other examples of interacting with the selected stickers 28 include tapping the content 26, swiping the content 26, sliding the content 26, and/or holding a stick.

By having the selected stickers 28 displayed in overlays 42 of the video, the user 104 may interact with and/or engage with the content 26 and remain within the context of the video platform 12, and thus, seamlessly discover the content 26 within the interface of the video platform 12. The different information (e.g., the content 26) provided by the selected stickers 28 is populated in the overlays 42 within the video platform 12. As such, the user 104 may access the additional content 26 while remaining within a context of the video platform 12.

In some implementations, one or more computing devices (e.g., devices 102) are used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the video platform 12, the video creation component 14, the sticker generating component 18, the video consumption component 36, and/or the datastore 106, 108 are implemented wholly on the same computing device. Another example includes one or more subcomponents of the video platform 12, the video creation component 14, the sticker generating component 18, the video consumption component 36, and/or the datastores 106, 108 implemented across multiple computing devices. Moreover, in some implementations, the video platform 12, the video creation component 14, the sticker generating component 18, the video consumption component 36, and/or the datastores 106, 108 are implemented or processed on different server devices of the same or different cloud computing networks. Moreover, in some implementations, the features and functionalities are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

As such, the environment 100 provides an interactive and engaging video platform 12 that allows the users 104 to consume and/or interact with additional content 26 related to the video 16.

Figure 2:
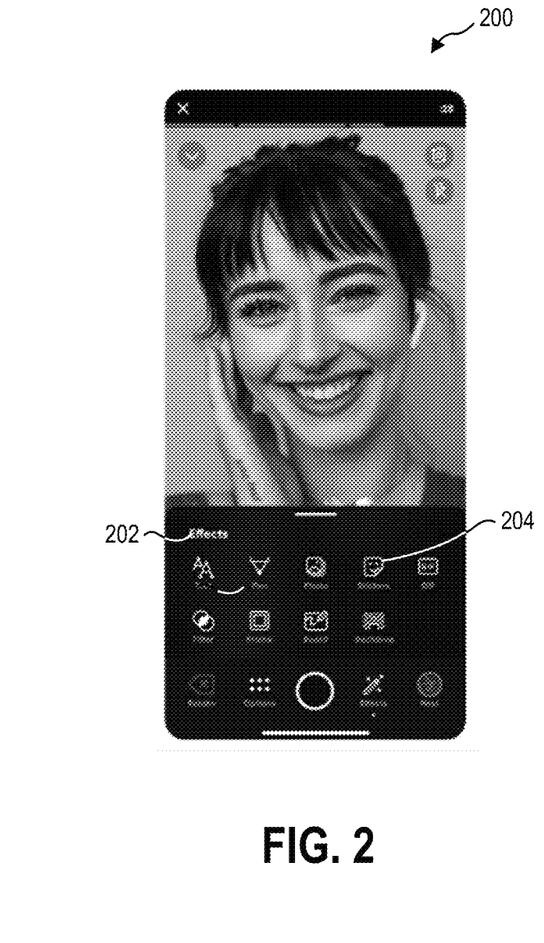
FIG. 2 illustrates an example graphical user interface with different effects for use with videos in accordance with implementations of the present disclosure.

Referring now to FIG. 2, illustrated is an example graphical user interface (GUI) 200 with different effects 202 for use with the videos 16 (FIG. 1) using the video platform 12 (FIG. 1). The effects 202 may include adding text, a photo, stickers 24 (FIG. 1), a GIF, a frame, and/or a backdrop to the video 16. The effects 202 may also include using a pen to mark on the video 16 or add text to the video 16. The effects 202 may also include using a filter on the video 16 and/or using a board to draw on the video 16. The user 104 (FIG. 1) may select one or more icons associated with the different effects 202 to add the effects 202 to the video 16. For example, the user 104 selects a stickers icon 204 to add one or more stickers 24 to the video 16.

Figure 3:
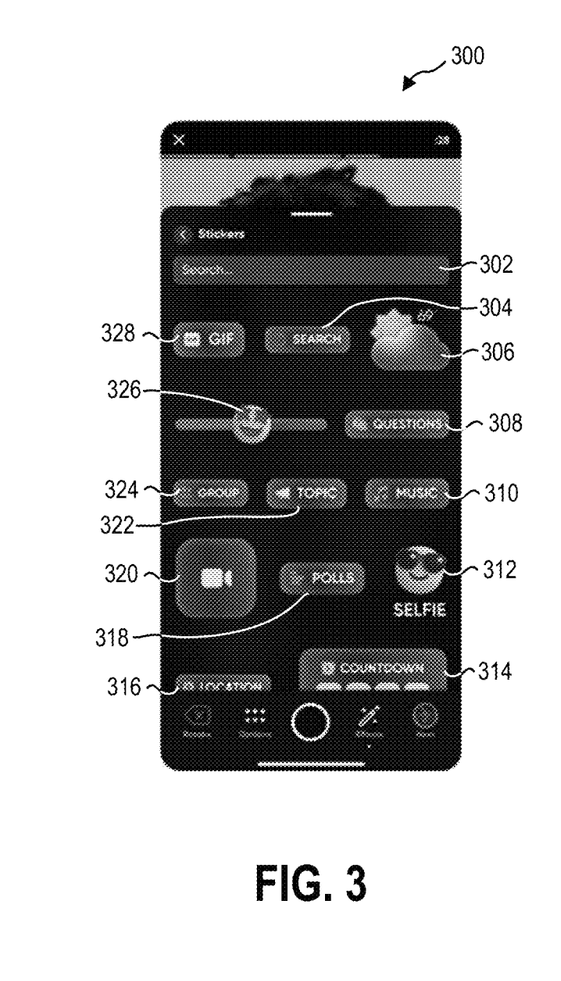
FIG. 3 illustrates an example graphical user interface with different options for stickers in accordance with implementations of the present disclosure.

Referring now to FIG. 3, illustrated is an example GUI 300 with different options for stickers 24 (FIG. 1) to add to videos 16 (FIG. 1) using the video platform 12 (FIG. 1). The sticker generating component 18 (FIG. 1) may display the different icons 304, 306, 308, 310, 312, 314, 316. 318, 320, 322, 324, 326, 328 with different options for stickers 24 in response to the user 104 (FIG. 1) selecting the sticker icon 204 (FIG. 2).

The icon 304 may allow the user 104 to perform a search for additional content 26 (FIG. 1) to add to the stickers 24. A text input box 302 may be displayed and the user 104 may enter in a query 20 (FIG. 1) with search terms 22 (FIG. 1) in the text input box 302 for additional content 26 to add to the stickers 24. In an implementation, the text input box 302 is displayed in response to the user 104 selecting the icon 304. In an implementation, the user may speak or otherwise provide the query 20 with the search terms 22 in response to selecting the search icon 304. The sticker generating component 18 may obtain the related content 26 to the search terms 22 from the datastores 106 (FIG. 1) and may dynamically generate one or more stickers 24 with the content 26.

The icon 306 may provide weather information to include in the stickers 24. For example, the weather information may include the current weather forecast for a location where the user 104 is creating the video 16 and/or consuming the video 16. The weather information may also include weather information for a location included in the video 16 (e.g., an average weather of the location or the current weather of the location).

The icon 308 may provide questions that the user 104 may include in the stickers 24. For example, the questions may be about a topic discussed in the video 16. Another example includes the questions being used as a quiz or test after the video 16, or a portion of the video 16, is played.

The icon 310 may provide music, or other audio, to include in the stickers 24. The icon 312 may allow the user 104 to add selfie photographs, or other photographs, to the stickers 24. The icon 314 may allow the user 104 to add a countdown to the stickers 24.

The icon 316 may allow the user 104 to add location information to the stickers 24. The location information may be related to a place or landmark discussed or shown in the videos 16. The icon 318 may allow the user 104 to add polls to the stickers 24. The polls may be used to ask the viewers of the videos 16 questions or opinions about the videos 16.

The icon 320 may allow the user 104 to add videos to the stickers 24. The videos may be pre-generated videos (e.g., a recording of a sports game, or video of a speech) or may be other videos created by the user 104. The videos in the stickers 24 may be played upon the user 104 interacting with the stickers 24 and selecting to play the video.

The icon 322 may allow the user 104 to add topics (e.g., categories of videos 16 around the same subject) to the stickers 24. The icon 324 may allow the user 104 to add one or more groups (e.g., a set of users who have permissions or access to a collection of topics or responses) to the stickers 24. The icon 326 may allow the user 104 to add emojis to the stickers 24. The icon 328 may allow the user 104 to add GIFs to the stickers 24. As such, the users 104 may use GUI 300 to add a variety of different stickers 24 to the videos 16 the user 104 is creating.

Referring now to FIGS. 4A-4D, illustrated are example GUIs 400, 404, 416, 422 for adding stickers 24 (FIG. 1) to a video 16 (FIG. 1) and interacting with the stickers 24 in the video 16 using the video platform 12 (FIG. 1). GUI 400 illustrates an example use case of providing a query 20 (FIG. 1) in a text box 402 with search terms 22 for "Bill Nye." The user 104 may be a student making a video 16 about science and wants to add information about the scientist Bill Nye to the video 16. The text box 402 may be displayed in response to the user 104 selecting the search icon 304 (FIG. 3).

Figure 4A:
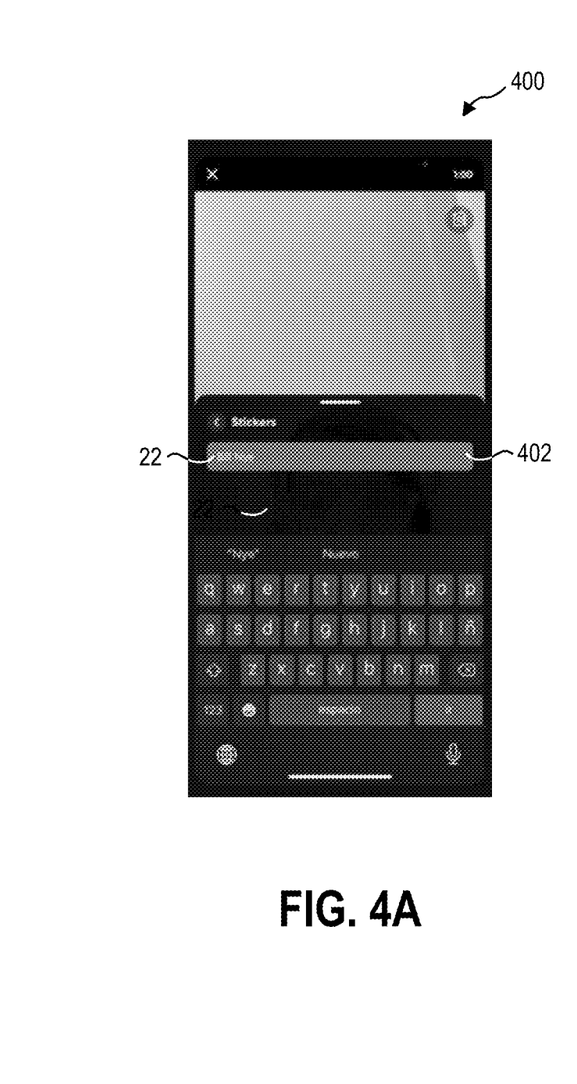
FIGS. 4A-4D illustrate example graphical user interfaces for adding stickers to a video and interacting with stickers in a video in accordance with implementations of the present disclosure.
Figure 4B:
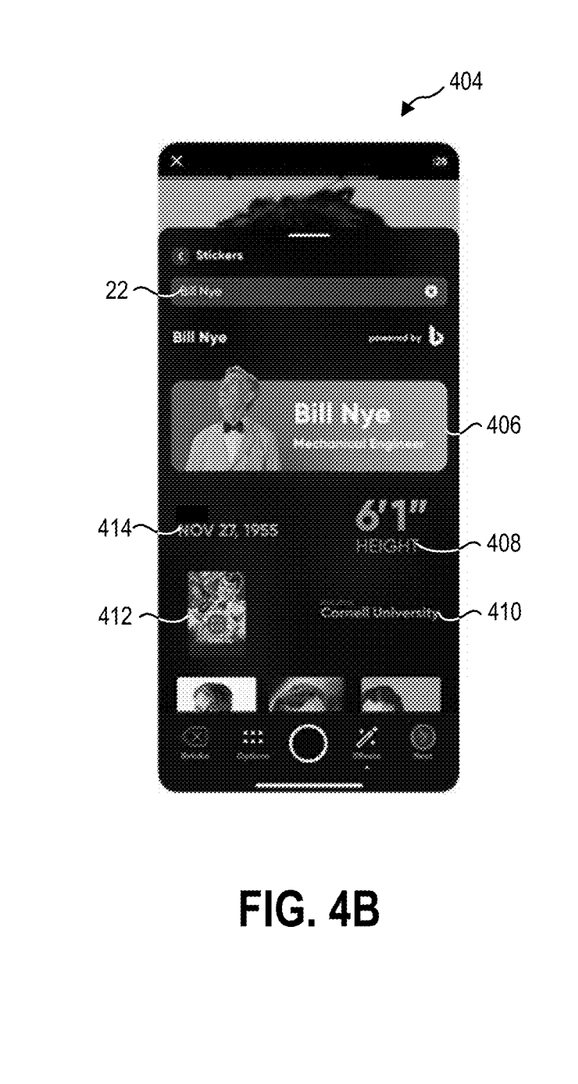

GUI 404 illustrates a plurality of stickers 24 (FIG. 1) (e.g., sticker 406, sticker 408, sticker 410, sticker 414) generated by the sticker generating component 18 (FIG. 1) in response to the query 20 with the search terms 22 "Bill Nye." Each sticker 406, 408, 410, 414 includes content 26 (FIG. 1) related to the search terms 22 "Bill Nye." For example, sticker 406 includes the content 26 with background information about Bill Nye (e.g., identifies that Bill Nye is a mechanical engineer). Sticker 408 includes content 26 with physical attributes information about Bill Nye (e.g., provides Bill Nye's height). Sticker 410 includes the content 26 with additional background information about Bill Nye (e.g., provides the university that Bill Nye attended). Sticker 412 includes content 26 with information about a book authored by Bill Nye. Sticker 414 includes additional background information about Bill Nye (e.g., provides Bill Nye's birthdate). The sticker generating component 18 automatically generates the different stickers (e.g., stickers 406, 408, 410, 414) with content 26 obtained from the datastores 106 (FIG. 1) that is related to the search terms 22.

Figure 4C:
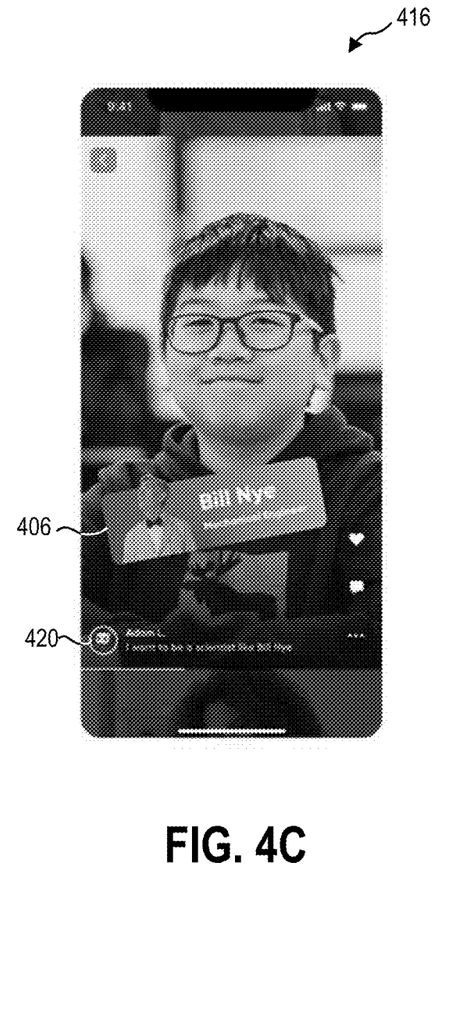

GUI 416 illustrates a selected sticker 28 (e.g., sticker 406) of the plurality of stickers 24 (e.g., stickers 406, 408, 410, 414) generated by the sticker generating component 18 to add in the video 16. The user 104 may rotate the sticker 406 and place the sticker 406 at an angle on the video 16. In addition, the user 104 may place the same sticker 406 at different times and/or scenes in the video 16. The video consumption component 36 (FIG. 1) may place the sticker 406 in an overlay 42 on the video 16 when the video 16 is played at the placement 32 and the time selected by the user 104. The user 104 and/or other viewers of the video 16 may add one or more comments 420 to the video 16. The comments 420 may be related to the content 26 included in the sticker 406. In addition, the comments 420 may be related to the information included in the 2 video 16.

Figure 4D:
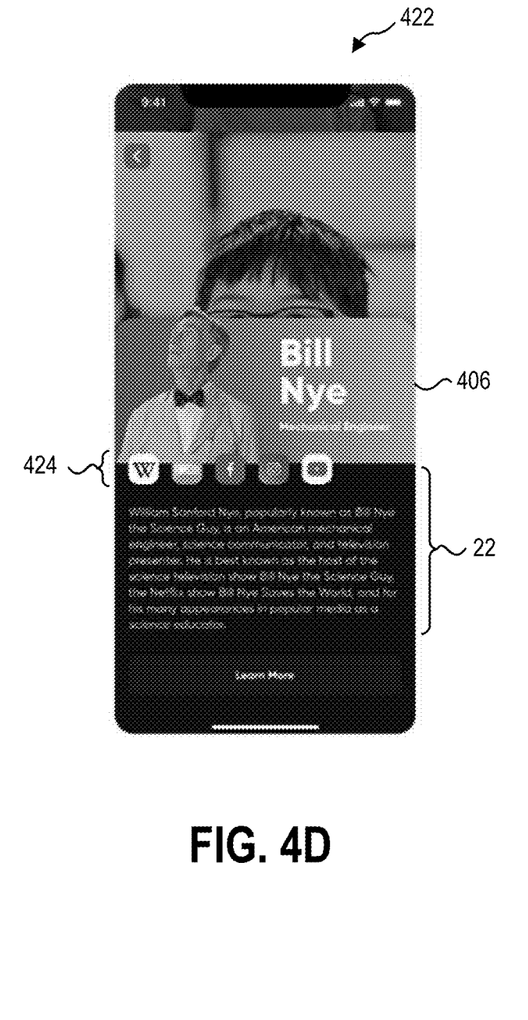

GUI 422 illustrates an example user interaction with the sticker 406. For example, the user 104 may click on the sticker 406 and additional content 26 may be displayed for the sticker 406. The GUI 422 also provides different links 424 the user 104 may select to obtain additional information related to the sticker 406. By having the sticker 406 displayed in an overlay 42 of the video 16, the additional content 26 may be displayed within the GUI 422. In addition, by having the sticker 406 displayed in an overlay 42 of the video 16, upon the user 104 selecting one or more links 424 to other applications or web browsers, the applications or web browsers may open within the overlay 42 allowing the user 104 to remain within the context of the GUI 422 of the video platform 12. Thus, the user 104 may engage with additional content 26 and/or explore additional information all while remaining within the user interfaces of the video platform 12.

Figure 5A:
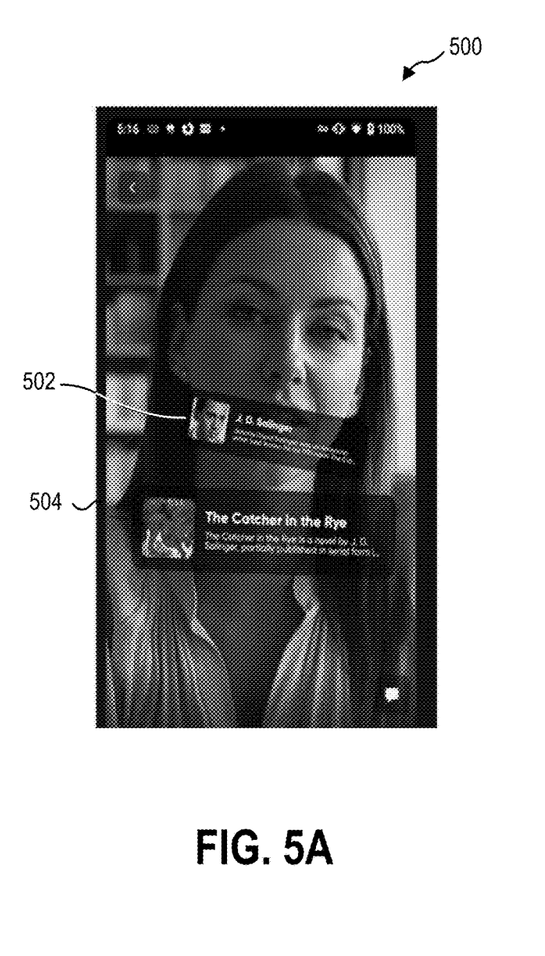
FIGS. 5A-5C illustrate example graphical user interfaces for adding a plurality of stickers to a video and interacting with a plurality of stickers in a video in accordance with implementations of the present disclosure.
Figure 5B:
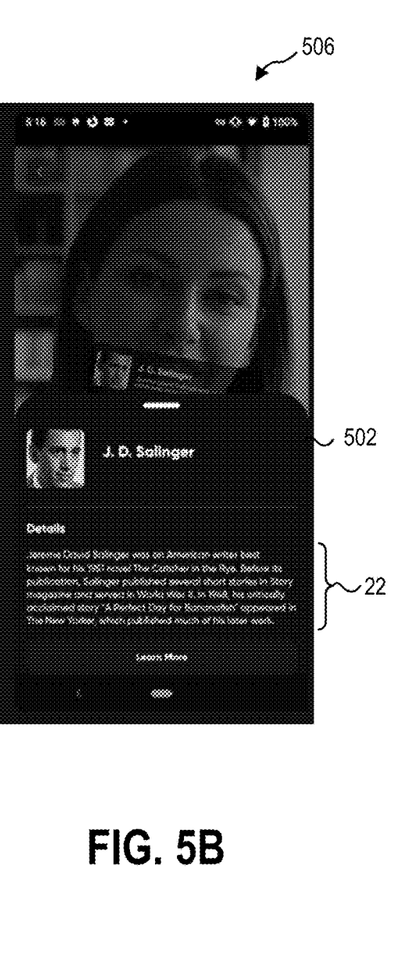
Figure 5C:
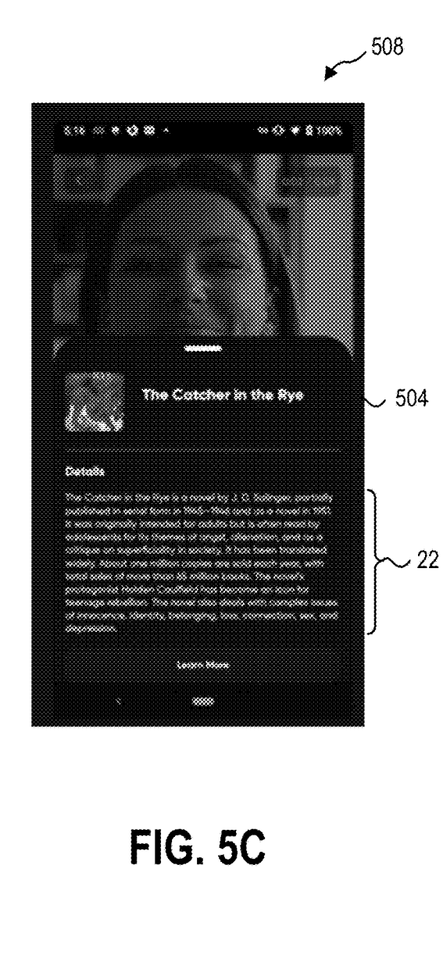

Referring now to FIGS. 5A-5C, illustrated are example GUIs 500, 506, 508 for adding a plurality of stickers 24 (FIG. 1) to a video 16 (FIG. 1) and interacting with a plurality of stickers 24 (FIG. 1) in a video 16 (FIG. 1) using the video platform 12 (FIG. 1). The GUI 500 illustrates a selection of a plurality of stickers 28 (e.g., sticker 502 and sticker 504) to add to the video 16. For example, the user 104 added two different stickers 502, 504 generated by the sticker generating component 18 (FIG. 1) to the same time and/or scene in the video 16. In an implementation, two different overlays 42 (FIG. 1) are used to place the stickers 502, 504 on top the video 16. In another implementation, a single overlay 42 is used to place the stickers 502, 504 over the video 16.

The GUI 506 illustrates an example of an interaction with the sticker 502. For example, the user 104 selects the sticker 502 and the additional content 26 obtained by the sticker generating component 18 for the sticker 502 is expanded and displayed on the GUI 506.

The GUI 508 illustrates an example of an interaction with the sticker 504. For example, the user 104 selects the sticker 504 and the additional content 26 obtained by the sticker generating component 18 for the sticker 504 is expanded and displayed on the GUI 506. By having the stickers 502, 504 displayed in an overlay 42 on top of the video 16, the additional content 26 is presented within the GUI 508 without the user 104 having to leave the user interfaces of the video platform 12.

Figure 6:
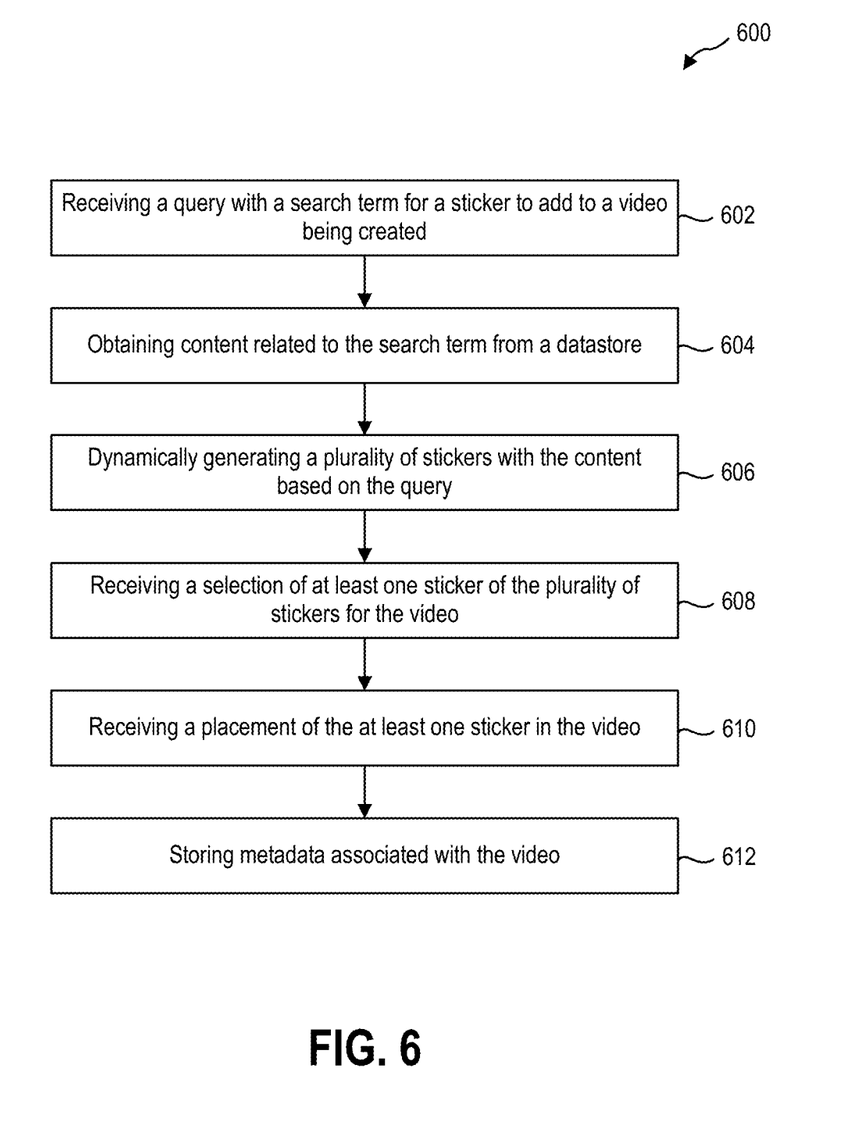
FIG. 6 illustrates an example method for creating stickers in accordance with implementations of the present disclosure.

Referring now to FIG. 6, illustrated is an example method 600 for creating stickers 24 (FIG. 1) for a video 16 (FIG. 1) using a video platform 12 (FIG. 1). The actions of the method 600 are discussed below with reference to the architecture of FIG. 1. The video platform 12 may include a video creation component 14 that allows the user 104 to create one or more videos 16.

At 602, the method includes receiving a query with a search term for a sticker to add to a video being created. The users 104 may provide input to the video creation component 14 to add one or more stickers 24 to the video 16. For example, the user selects an icon to add stickers 24 to the video 16. The stickers 24 allow the users 104 to add additional details and/or information outside of what is said or shown in the video 16. The stickers 24 include static and/or dynamic content 26 placed on the video 16. Examples of the stickers 24 include emojis, graphics interchange format (GIF)s, drawings, videos, audio, music, photographs, text, and/or other additional information.

A sticker generating component 18 may allow the user 104 to enter one or more queries 20 with search terms 22 for additional information to include in the stickers 24. For example, the user 104 may input the queries 20 in a text box. Another example includes using audio input for a spoken query 20 provided by the user 104.

At 604, the method includes obtaining content related to the search term from a datastore. The content 26 is obtained by the sticker generating component 18 from one or more datastores 106. For example, the sticker generating component 18 may use one or more application programming interfaces (APIs) to access the content 26 from the datastores 106. The content 26 may be related to the search terms 22. In addition, the content 26 may be temporally or contextually related to the search term 22. The sticker generating component 18 may obtain related content 26 from the datastores 106 by matching the words or phrases in the content 26 to the search terms 22. In an implementation, the datastore 106 is an external knowledge source of data. In an implementation, the datastore 106 is a third party source of data.

At 606, the method includes dynamically generating a plurality of stickers with the content based on the query. The sticker generating component 18 dynamically generates one or more stickers 24 with content 26 related to the search terms 22 obtained from the datastores 106 based on the searching performed by the user 104. For example, the sticker generating component 18 automatically creates pre-populated stickers 24 based on the search terms 22 in response to the queries 20 provided by the users 104. In an implementation, the stickers 24 are live stickers that may dynamically update as the content 26 changes as the video 16 plays. In an implementation, the stickers 24 are static stickers where the content 26 may not change as the video 16 plays.

At 608, the method includes receiving a selection of at least one sticker of the plurality of stickers for the video. The user 104 may select one or more of the stickers 24 generated for the video 16. In an implementation, the at least one sticker (e.g., the selected sticker 28) for the video 16 is a subset of the plurality of stickers 24 automatically generated by the sticker generating component 18. In another implementation, the at least one sticker (e.g., the selected sticker 28) for the video 16 include all of the stickers 24 automatically generated by the sticker generating component 18.

At 610, the method includes receiving a placement of the at least one sticker in the video. The user 104 may select a placement 32 for the at least one sticker (e.g., the selected sticker 28). The placement 32 may include a time in the video 16 or a scene in the video 16 where the at least one sticker (e.g., the selected sticker 28) is positioned. In addition, the placement 32 may indicate a position for the at least one sticker (e.g., the selected sticker 28) on a screen of the display 110 (e.g., a top portion of the screen, a lower portion of the screen, in a corner of the screen, on a side of the screen, and/or diagonally across the screen). The placement 32 may also indicate a size of the at least one sticker (e.g., the selected sticker 28). As such, the placement 32 may also indicate a rotation of the at least one sticker (e.g., the selected sticker 28) and a scale of the at least one sticker (e.g., the selected sticker 28).

At 612, storing metadata associated with the video. Upon completing the video 16 creation process, the video platform 12 may store the video 16 and the associated metadata 34 in one or more datastores 108. The videos 16 may be accessed or obtained from the datastores 108 when the user 104 or other viewers want to play the videos 16.

The metadata 34 includes sticker information 30 with the content 26 and the placement 32 for the at least one sticker (e.g., the selected sticker 28). The sticker information 30 may indicate whether the at least one sticker (e.g., the selected sticker 28) is a live sticker that dynamically updates with changing content 26 obtained from the datastore 106. The sticker information 30 may also include a size of the at least one sticker (e.g., the selected sticker 28), a rotation of the at least one sticker (e.g., the selected sticker 28), a scale of the at least one sticker (e.g., the selected sticker 28), or a theme of the at least one sticker (e.g., the selected sticker 28).

The method 600 may optionally include receiving a selection of second sticker (e.g., another selected sticker 28) of the plurality of stickers 24 for the video 16. The method 600 may optionally include receiving the placement 32 of the second sticker (e.g., another selected sticker 28) in the video 16. The method 600 may optionally include storing the metadata 34 associated with the video 16 with the content 26 and the placement 32 of the at least one sticker (e.g., the selected sticker 28) and the second sticker (e.g., another selected sticker 28).

As such, the method 600 allows the users 104 to provide engaging, customized content 26 for use in video creation and storytelling, and thus, providing the users 104 engaging and expressive storytelling.

Figure 7:
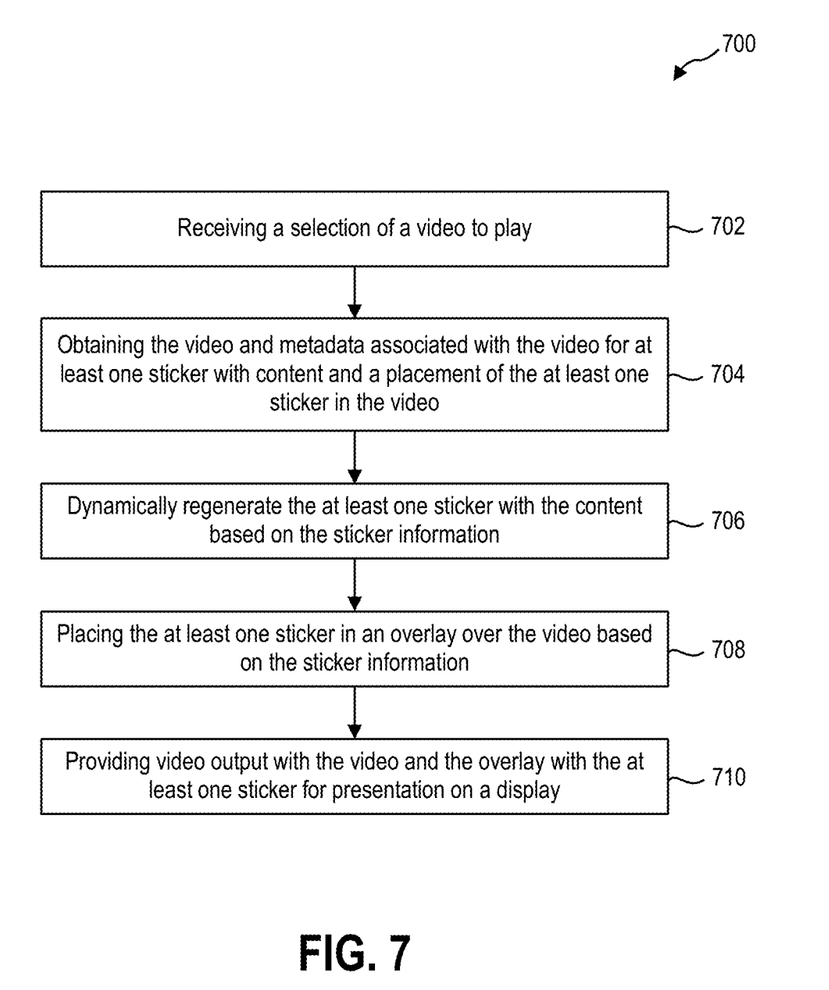
FIG. 7 illustrates an example method for playing a video with stickers in accordance with implementations of the present disclosure.

Referring now to FIG. 7, illustrated is an example method 700 for playing a video 16 (FIG. 1) with stickers 24 (FIG. 1) using a video platform 12 (FIG. 1). The actions of the method 700 are discussed below with reference to the architecture of FIG. 1.

At 702, the method 700 includes receiving a selection of a video to play. The video platform 12 may include a video consumption component 36 that allows the user 104 or other viewers to consume the videos 16 (e.g., play the videos 16 or watch the videos 16). The video consumption component 36 may receive a selected video 16 from the user 104 to play. For example, the user 104 searches for a video 16, provides a title of a video 16, and/or selects an icon for the video 16.

At 704, the method 700 includes obtaining the video and metadata associated with the video with content and a placement of the at least one sticker in the video. The video consumption component 36 obtains the video 16 selected by the user 104 and the associated metadata 34 from the datastore 108. The metadata 34 may include sticker information 30 with the content 26 and the placement 32 of the at least one sticker (e.g., the selected sticker 28). The sticker information 30 may also include the content 26 for the at least one sticker (e.g., the selected sticker 28), a time in the video 16 to place the at least one sticker (e.g., the selected sticker 28), a size of the at least one sticker (e.g., the selected sticker 28), a rotation of the at least one sticker (e.g., the selected sticker 28), a scale of the at least one sticker (e.g., the selected sticker 28), or a theme of the at least one sticker (e.g., the selected sticker 28).

At 706, the method 700 includes dynamically regenerate the at least one sticker with the content based on the sticker information. A sticker regenerating component 38 may dynamically regenerate the selected stickers 28 based on the sticker information 30. The sticker regenerating component 38 uses the sticker information 30 to identify which content 26 to obtain from the datastores 106 for the selected stickers 28. In an implementation, the datastore 106 is a third party knowledge source of data. As such, in response to the user 104 providing an indication to view the selected video 16, the sticker regenerating component 38 obtains the content 26 for the selected stickers 28 associated with the video 16. If the content 26 changes and/or is updated in the datastore 106 between the creation of the video 16 and the consumption of the video 16, the content 26 obtained by the sticker regenerating component 38 may be the most up to date content 26 available in the datastores 106. Thus, upon consumption of the video 16, the content 26 included in the selected stickers 28 includes the latest information or details regarding the topic from the datastore 106.

At 708, the method 700 includes placing the at least one sticker in an overlay over the video based on the sticker information. the sticker regenerating component 38 uses the sticker information 30 to identify any details regarding the selected stickers 28 (e.g., a theme of the selected stickers, whether the selected stickers 28 are live stickers or static stickers, and/or a size of the text or images of the content 26). The sticker regenerating component 38 may also use the sticker information 30 to identify a placement 32 of the selected stickers 28. The sticker regenerating component uses the sticker information 30 to regenerate the selected stickers 28 based on any customization provided by the user 104.

At 710, the method 700 includes providing video output with the video and the overlay with the at least one sticker for presentation on a display. The video consumption component 36 may generate video output 40 with the video 16 and one or more overlays 42 to display the selected stickers 28 over the video 16 as the video 16 is playing. The overlays 42 are visually distinct from the video 16 (e.g., have a border or otherwise offset the selected stickers 28 from the video 16).

The video consumption component 36 uses the sticker information 30 to identify a placement 32 of the selected stickers 28 in the video 16. The video consumption component 36 uses the placement 32 to determine a time in the video 14 to place the selected stickers 28. In addition, the video consumption component 36 uses the placement 32 to determine a scale and/or a rotation of the selected stickers 28. The video consumption component 36 also uses the placement 32 to determine a position on the screen to display the selected stickers 28 (e.g., coordinates of the display 110 where the selected sticker 28 is positioned).

In an implementation, the content 26 presented in the at least one sticker (e.g., the selected sticker 28) is updated from the datastore 106 after the video 16 is published to a video platform 12 for consumption. In an implementation, the content 26 presented in the at least one sticker (e.g., the selected sticker 28) is dynamically updated with changing content 26 obtained from a datastore 106 as the video 16 plays. The video output 40 is presented on a display 110 of the device 102. The user 104 may view the video 16 and the selected stickers 28.

The method 700 may optionally receive an interaction with the at least one sticker (e.g., the selected sticker 28) and display additional content 26 in response to the interaction. By having the selected stickers 28 displayed in overlays 42 of the video 16, the user 104 may interact with the selected stickers 28. For example, the user 104 expands the content 26 presented in the selected stickers 28. Another example of interacting with the selected stickers 28 includes purchasing a product included in the content 26 by selecting the product in the content 26. Another example of interacting with the selected stickers 28 includes loading a webpage identified in the content 26 within the overlay 42. Another example of interacting with the selected stickers 28 includes answer questions provided in the content 26 within the overlay 42.

As such, the method 700 may provide an interactive and engaging video platform 12 that allows the users 104 to consume and/or interact with additional content 26 related to the video 16.

Figure 8:
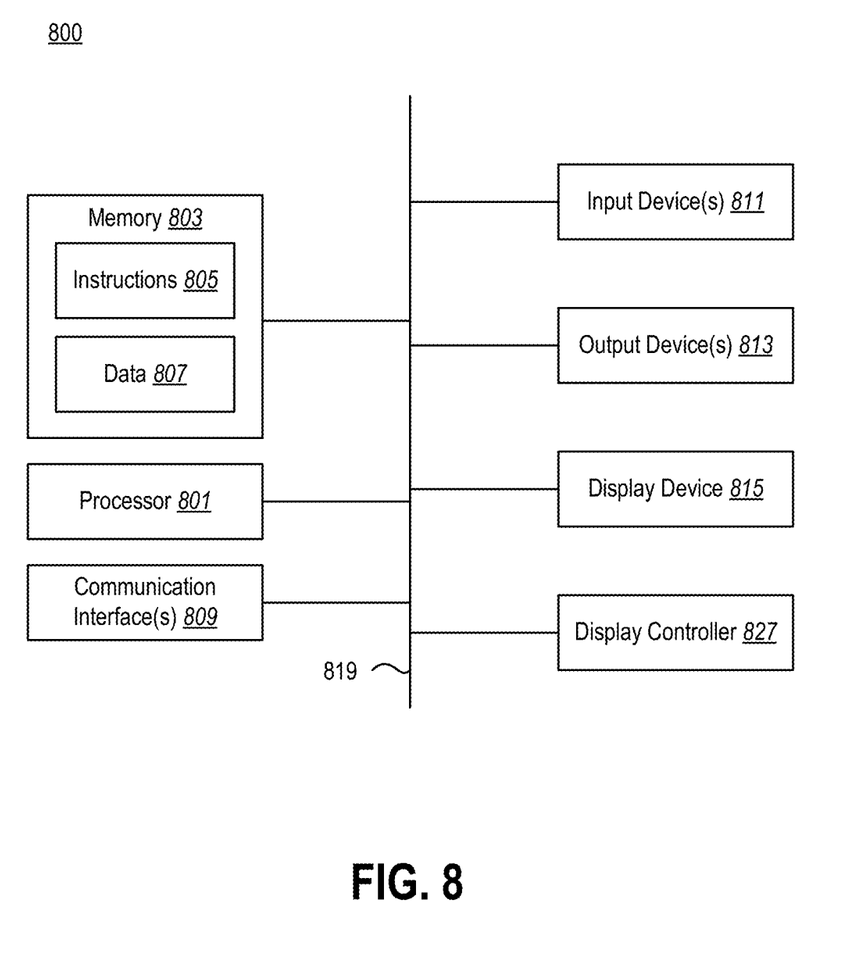
FIG. 8 illustrates components that may be included within a computer system.

FIG. 8 illustrates components that may be included within a computer system 800. One or more computer systems 800 may be used to implement the various methods, devices, components, and/or systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving a query with a search term for a sticker to add to a video being created;
obtaining content related to the search term from a datastore in response to the query by matching the search terms to the content;
automatically generating a plurality of stickers using the content obtained, wherein the content provides additional information related to the video while the video is playing;
receiving a selection of at least one sticker of the plurality of stickers for the video, wherein the at least one sticker is a live sticker that dynamically updates the content in the live sticker as the video is played in response to the content obtained from the datastore changing;
receiving a placement of the at least one sticker in the video; and
storing metadata associated with the video, wherein the metadata includes sticker information with the content and the placement of the sticker.

2. The method of claim 1, wherein the datastore is an external knowledge source of data.

3. The method of claim 1, wherein the content is temporally or contextually related to the search term.

4. The method of claim 1, wherein the placement includes a time in the video or a scene in the video where the at least one sticker is positioned.

5. The method of claim 1, wherein the sticker information indicates whether the at least one sticker is a live sticker that dynamically updates with changing content obtained from the datastore.

6. The method of claim 1, wherein the sticker information further includes one or more of a size of the at least one sticker, a rotation of the at least one sticker, a scale of the at least one sticker, or a theme of the at least one sticker.

7. The method of claim 1, further comprising:
receiving a selection of a second sticker of the plurality of stickers for the video;
receiving the placement of the second sticker in the video; and storing the metadata associated with the video, wherein the metadata includes sticker information with the content and the placement of the at least one sticker and the second sticker.

8. A device, comprising:
one or more processors;
memory in electronic communication with the one or more processors; and
instructions stored in the memory, the instructions being executable by the one or more processors to:
receive a query with a search term for a sticker to add to a video being created;
obtain content related to the search term from a datastore in response to the query;
automatically generate a plurality of stickers using the content obtained, wherein the content provides additional information related to the video while the video is playing;
receive a selection of at least one sticker of the plurality of stickers for the video, wherein the at least one sticker is a live sticker that dynamically updates the content in the live sticker as the video is played in response to the content obtained from the datastore changing;
receive a placement of the at least one sticker in the video; and
store metadata associated with the video, wherein the metadata includes sticker information with the content and the placement of the at least one sticker.

9. The device of claim 8, wherein the content is temporally or contextually related to the search term.

10. The device of claim 8, wherein the placement includes a time in the video or a scene in the video where the at least one sticker is positioned.

11. The device of claim 8, wherein the sticker information indicates whether the at least one sticker is a live sticker that dynamically updates with changing content obtained from the datastore.

12. The device of claim 8, wherein the sticker information further includes one or more of a size of the at least one sticker, a rotation of the at least one sticker, a scale of the at least one sticker, or a theme of the at least one sticker.

13. The device of claim 8, the instructions being executable by the one or more processors to:
receive a second sticker of the plurality of stickers for the video;
receive the placement of the second sticker in the video; and
store the metadata associated with the video, wherein the metadata includes sticker information with the content and the placement of the at least one sticker and the second sticker.

14. The method of claim 1, further comprising:
providing video output with the video and an overlay with the at least one sticker that displays the at least one sticker over the video at the placement as the video is playing.

15. The method of claim 1, wherein the content of the at least one sticker includes interactive content related to the video in response to a user clicking on the at least one sticker.

16. The device of claim 8, wherein the instructions being executable by the one or more processors are further operable to:
provide video output with the video and an overlay with the at least one sticker that displays the at least one sticker over the video at the placement as the video is playing.

17. The device of claim 8, wherein the content of the at least one sticker includes interactive content related to the video in response to a user clicking on the at least one sticker.

18. The method of claim 1, wherein the live sticker includes different content when the video is played as compared to when the video is created.

19. The device of claim 8, wherein the live sticker includes different content when the video is played as compared to when the video is created.

* * * * *